(12) United States Patent
Yoshihara et al.

(10) Patent No.: US 10,955,296 B2
(45) Date of Patent: Mar. 23, 2021

(54) TEMPERATURE SENSOR

(71) Applicant: SHIBAURA ELECTRONICS CO., LTD., Saitama (JP)

(72) Inventors: Takamasa Yoshihara, Saitama (JP); Michiru Takemura, Semboku (JP); Masanori Kirihara, Semboku (JP)

(73) Assignee: SHIBAURA ELECTRONICS CO., LTD., Saitama (JP)

(*) Notice: Subject to any disclaimer, the term of this patent is extended or adjusted under 35 U.S.C. 154(b) by 256 days.

(21) Appl. No.: 15/770,540

(22) PCT Filed: Feb. 9, 2017

(86) PCT No.: PCT/JP2017/004765
§ 371 (c)(1),
(2) Date: Apr. 24, 2018

(87) PCT Pub. No.: WO2018/146776
PCT Pub. Date: Aug. 16, 2018

(65) Prior Publication Data
US 2019/0064000 A1    Feb. 28, 2019

(51) Int. Cl.
*G01K 1/08* (2021.01)
*G01K 7/22* (2006.01)

(52) U.S. Cl.
CPC .............. *G01K 1/08* (2013.01); *G01K 7/22* (2013.01)

(58) Field of Classification Search
CPC .............. G01K 1/08; G01K 7/22; G01K 7/00
See application file for complete search history.

(56) References Cited

U.S. PATENT DOCUMENTS

| 4,337,221 A | * | 6/1982 | Gray | ............... B28B 23/00 |
| | | | | 136/234 |
| 4,485,263 A | * | 11/1984 | Itoyama | ............... G01K 1/08 |
| | | | | 136/230 |

(Continued)

FOREIGN PATENT DOCUMENTS

| EP | 1096241 A1 | 5/2001 |
| EP | 2333504 A1 | 6/2011 |

(Continued)

OTHER PUBLICATIONS

English Translation of International Preliminary Report on Patentability for PCT/JP2017/004765 dated Aug. 13, 2019.

(Continued)

*Primary Examiner* — Nathaniel T Woodward
*Assistant Examiner* — Philip L Cotey
(74) *Attorney, Agent, or Firm* — Pearne & Gordon LLP (57) ABSTRACT

A temperature sensor of the present invention includes a sensor element (11) that includes a main body (13) and paired lead wires (15 and 15) drawn from the main body (13), and a first housing (19) that includes a resin mold layer and covers the sensor element (11). The main body (13) is partially or entirely exposed, continuously in a circumferential direction, from the first housing (19) without being covered with the first housing. In the temperature sensor, the main body (13) includes a thermosensitive body (13A) and a sealing glass (13B) covering the thermosensitive body (13A), and the sealing glass (13B) is exposed from the first housing (19).

6 Claims, 6 Drawing Sheets

(56) References Cited

U.S. PATENT DOCUMENTS

| | | | | |
|---|---|---|---|---|
| 5,133,606 A * | 7/1992 | Zaragoza | ............. | G01K 13/002 |
| | | | | 374/170 |
| 5,309,133 A * | 5/1994 | Berger | ................... | G01K 7/183 |
| | | | | 338/22 R |
| 5,696,348 A * | 12/1997 | Kawamura | ............ | G01K 1/125 |
| | | | | 136/201 |
| 5,743,646 A * | 4/1998 | O'Connell | ............... | G01K 1/08 |
| | | | | 374/148 |
| 6,297,723 B1 * | 10/2001 | Shoji | ........................ | G01K 7/22 |
| | | | | 338/229 |
| 2002/0135454 A1 * | 9/2002 | Ichida | ...................... | G01K 7/18 |
| | | | | 338/25 |
| 2003/0146819 A1 * | 8/2003 | Shibayama | .............. | G01K 7/22 |
| | | | | 338/22 R |
| 2007/0110124 A1 | 5/2007 | Shiraki | | |
| 2007/0237205 A1 * | 10/2007 | Hayashi | ................... | G01K 1/18 |
| | | | | 374/163 |
| 2013/0195144 A1 * | 8/2013 | Hatano | .................... | G01K 1/14 |
| | | | | 374/208 |
| 2015/0244097 A1 * | 8/2015 | Hirayama | ........... | G01L 19/0084 |
| | | | | 439/660 |
| 2016/0209277 A1 * | 7/2016 | Motooka | ................... | G01K 7/22 |
| 2017/0016773 A1 * | 1/2017 | Arai | ......................... | G01K 1/08 |

FOREIGN PATENT DOCUMENTS

| | | |
|---|---|---|
| JP | H02247532 A | 10/1990 |
| JP | 3039277 B2 | 5/2000 |
| JP | 2003139621 A | 5/2003 |
| JP | 2003139622 A | 5/2003 |
| JP | 2005024344 A | 1/2005 |
| JP | 2013015476 A | 1/2013 |

OTHER PUBLICATIONS

International Search Report for PCT/JP2017/004765 dated May 16, 2017.

Extended European Search Report for Application No. 17861199.2, dated Dec. 19, 2018.

* cited by examiner

TEMPERATURE SENSOR

This is a National Stage application of PCT international application PCT/JP2017/004765, filed on Feb. 9, 2017, which is incorporated herein by reference in its entirety.

TECHNICAL FIELD

The present invention relates to a temperature sensor including a housing formed of a resin mold.

BACKGROUND ART

There is a known temperature sensor in which a housing supports a temperature detection element and covers the temperature detection element. The housing is formed through injection molding with use of a resin more inexpensive than a metal.

For example, Patent Literature 1 discloses a temperature sensor in which a main body is covered with a resin mold. The main body includes a thermosensitive body that includes a thermistor and is embedded inside a glass insulator.

The resin mold in the temperature sensor is formed by disposing a detection element at a predetermined position in a cavity of a mold, and performing injection molding of a molten resin. The detection element includes a main body and a lead wire communicating with the main body. The main body and the like with which the molten resin flowing inside the cavity comes into contact cannot stay at a position before injection and are displaced because pressure of the molten resin injected into the cavity is considerably large. So-called short mold that is not preferable in the injection molding occurs at the displaced part. Accordingly, although Patent Literature 1 and the like describes that the main body is coincident with a center of the resin mold, the main body of the temperature sensor actually manufactured is displaced.

Figure 6A:
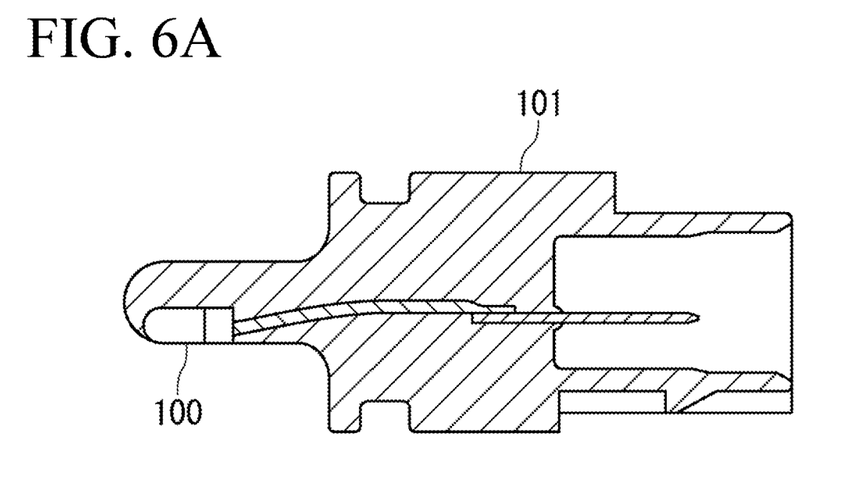
FIG. 6 is a diagram illustrating an example in which a part of a main body is exposed from a resin mold.

For example, as illustrated in FIG. 6A, a main body 100 is largely displaced from a center of a resin mold 101 in injection molding, and the main body 100 is accordingly exposed to outside from the resin mold 101 in some cases. If the temperature sensor is continuously used, gas or liquid as a temperature detection target may enter the inside of the resin mold 101 from a part at which the main body 100 is exposed to the outside.

Accordingly, as disclosed in Patent Literature 2, a primary molded body in which the main body is fixed by a resin mold is fabricated, and the injection molding is performed while the primary molded body is placed at a predetermined position inside the mold. This makes it possible to prevent displacement of the main body in secondary molding.

CITATION LIST

Patent Literature

Patent Literature 1: JP 2003-139621
Patent Literature 2: JP 2005-024344 A

SUMMARY OF INVENTION

Technical Problem

Figure 6B:
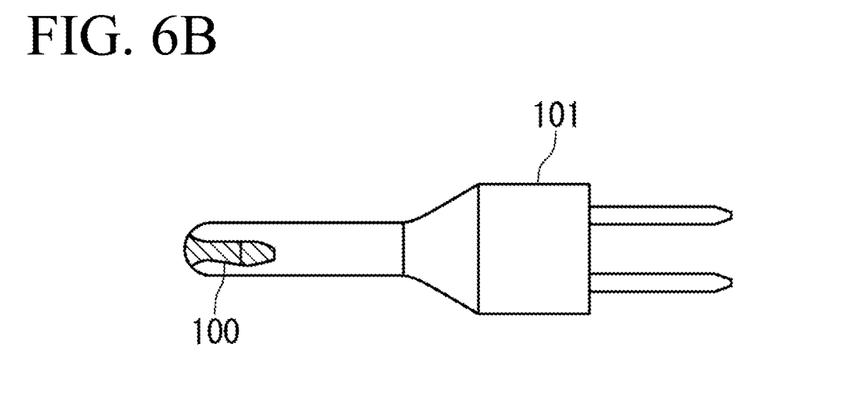

The main body 100, however, is originally displaced in the primary molding. Therefore, the main body 100 is exposed to the outside from the resin mold 101, or a thickness of the resin mold becomes smaller than the thickness of the other part even if the main body 100 is not exposed to the outside, as illustrated in FIG. 6B.

When the secondary molding is performed with use of the primary molded body, the displacement of the main body 100 is continued also after the secondary molding because the displaced main body 100 is fixed by the resin mold 101. Therefore, it is difficult to dispose the main body 100 at the desired position with high accuracy also in the secondary molded body. In addition, such displacement of the main body 100 may cause variation of detected temperature.

Accordingly, an object of the present invention is to provide a temperature sensor in which a main body supported by a resin mold layer is disposed at a desired position without displacement of the main body.

Solution to Problem

A temperature sensor according to the present invention includes a sensor element that includes a main body and paired lead wires drawn from the main body, and a first housing that includes a resin mold layer and covers the sensor element.

The main body in the temperature sensor of the present invention is partially or entirely exposed, continuously in a circumferential direction, from the first housing without being covered with the first housing.

The main body in the present invention may include a thermosensitive body and a sealing glass covering the thermosensitive body, and the sealing glass is exposed from the first housing.

The main body in the present invention may include a thermosensitive body, a sealing glass covering the thermosensitive body, and a ceramic protection pipe provided at a part of the sealing glass from which the lead wires are drawn. The first housing covers a part or whole of the ceramic protection pipe, and the sealing glass is exposed from the first housing.

The temperature sensor of the present invention may further include a second housing that includes a resin mold layer and covers the main body and the first housing. The main body comes into contact with the second housing without the first housing.

In the temperature sensor, the second housing around the main body may have a uniform thickness in the circumferential direction.

The temperature sensor of the present invention may include a second housing that includes a metal material and covers the main body and the first housing. The main body in the temperature sensor directly or indirectly comes into contact with the second housing without the first housing.

Advantageous Effects of Invention

Since the main body is not covered with the first housing and is exposed from the first housing in the temperature sensor of the present invention, it is possible to use a mold having a minute gap with the main body in the resin molding. Therefore, according to the temperature sensor of the present invention, it is possible to prevent displacement of the main body during injection molding, which enables the main body supported by the first housing including the resin mold layer to be disposed at a desired position.

Even when the second housing is provided on the temperature sensor through secondary molding or fitting, it is possible to dispose the main body at the desired position also in the temperature sensor including the second housing because the main body is disposed at the desired position.

Consequently, the temperature sensor according to the present invention makes it possible to achieve accurate temperature detection by suppressing temperature variation.

DESCRIPTION OF EMBODIMENTS

First Embodiment

A temperature sensor according to the present invention is specifically described below based on a first embodiment illustrated in accompanying FIG. 1 to FIG. 3.

A temperature sensor 1 according to the first embodiment includes a secondary molded body 20 (FIG. 2) that is obtained by further molding a primary molded body 10 (FIG. 1), with a resin. The primary molded body 10 includes a first housing 19 formed by molding with a resin.

The temperature sensor 1 has a feature that a main body 13 of the primary molded body 10 is intentionally exposed from the first housing 19. In the following, configurations of the primary molded body 10 and the secondary molded body 20 are described in order, and a procedure of molding the first housing 19 in the primary molded body 10 is next described.

[Primary Molded Body 10]

Figure 1A:
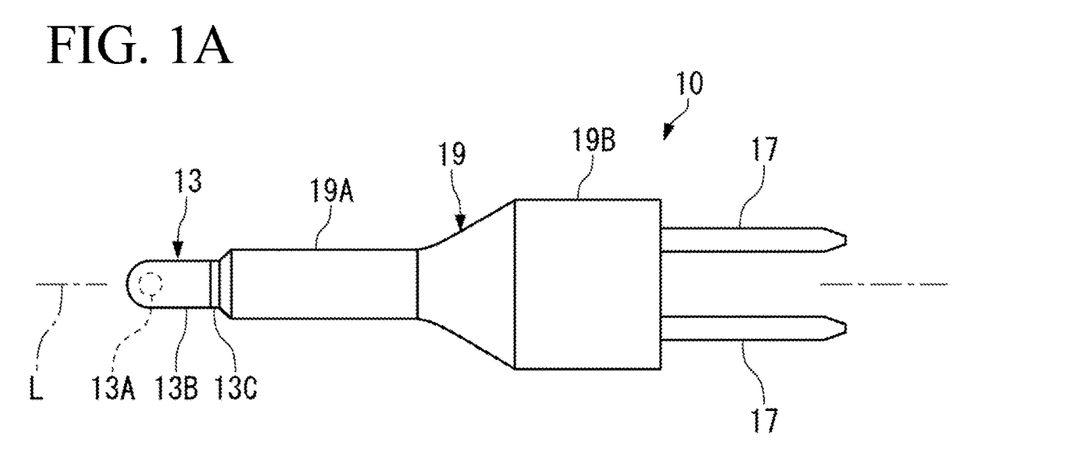
FIGS. 1A to 1C each illustrate a primary molded body of a temperature sensor according to a first embodiment of the present invention, FIG. 1A being a plan view, FIG. 1B being a side view, and FIG. 1C being a planar cross-sectional view.
Figure 1B:
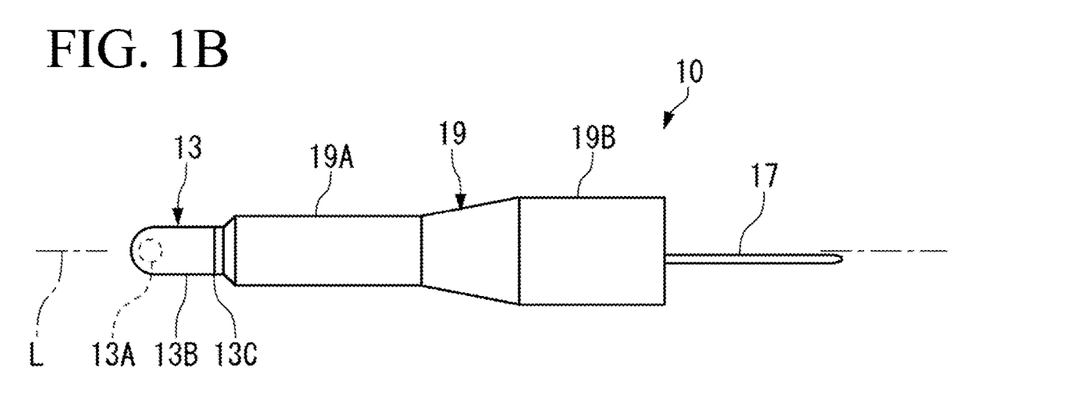
Figure 1C:
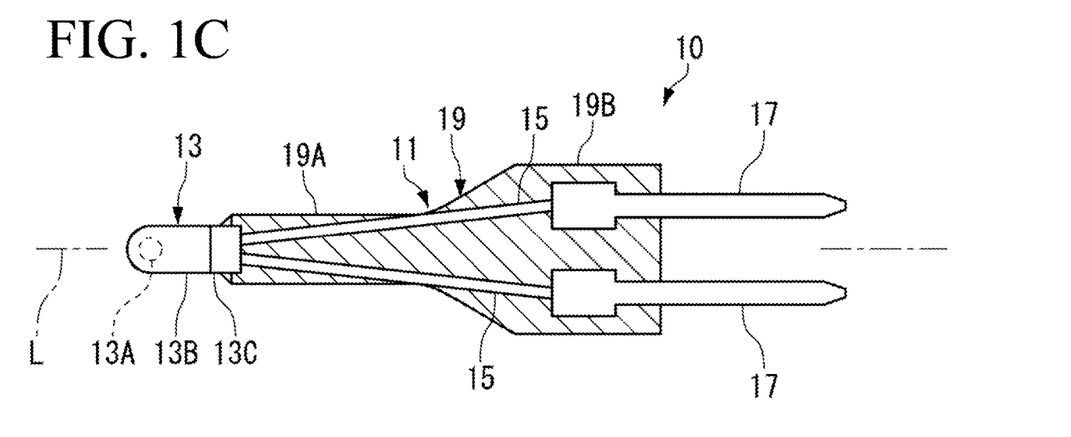
Figure 2A:
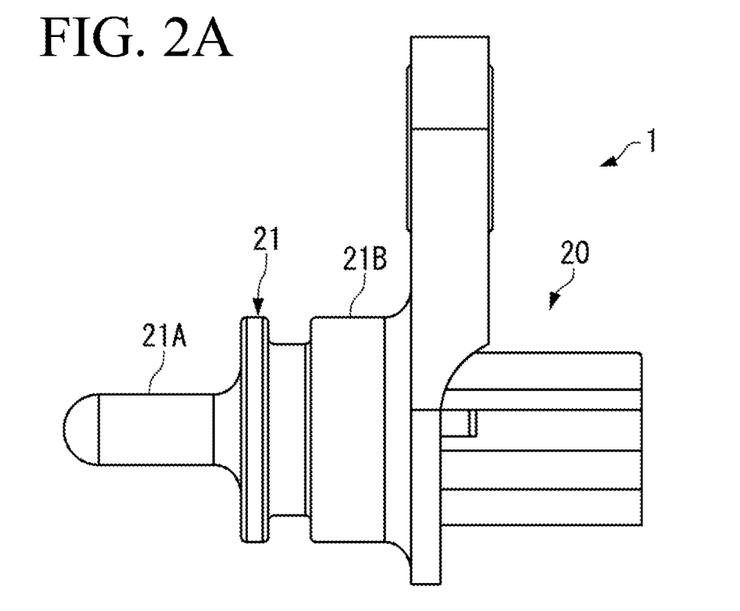
FIGS. 2A and 2B each illustrate a secondary molded body of the temperature sensor according to the first embodiment, FIG. 2A being a side view, and FIG. 2B being a vertical cross-sectional view.
Figure 2B:
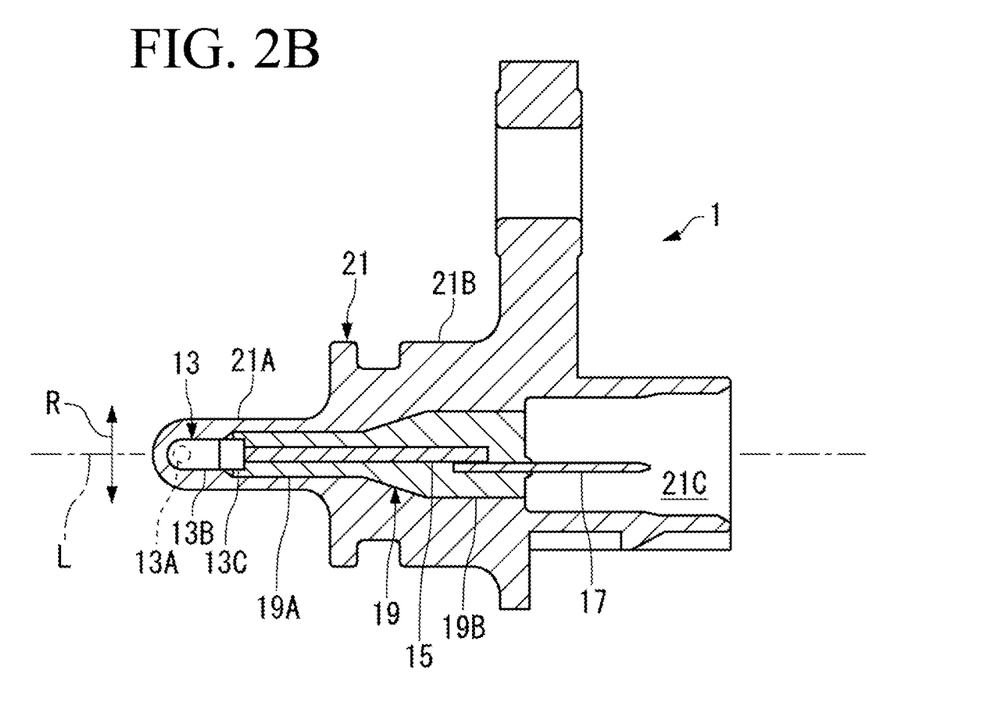

As illustrated in FIGS. 1A to 1C, the primary molded body 10 includes a sensor element 11 and the first housing 19 that covers the sensor element 11 except for a part thereof.

The sensor element 11 includes the main body 13, paired lead wires 15 and 15 drawn from the main body 13, and terminals 17 and 17 that are respectively connected to the lead wires 15 and 15. Note that, in the primary molded body 10, side provided with the sensor element 11 is defined as front, and side provided with the terminals 17 and 17 is defined as rear. The front and the rear have relative meaning.

The main body 13 is a cylindrical member that includes a thermosensitive body 13A, a sealing glass 13B, and a ceramic protection pipe 13C. The thermosensitive body 13A has temperature characteristics in electric resistance, like a thermistor. The sealing glass 13B covers surroundings of the thermosensitive body 13A. The ceramic protection pipe 13C is provided on rear end side of the sealing glass 13B.

For example, the thermosensitive body 13A includes a material having temperature characteristics in electric resistance, like a thermistor. The sealing glass 13B is provided in order to seal the thermosensitive body 13A to maintain the thermosensitive body 13A in an airtight state, thereby preventing chemical change and physical change based on an environmental condition from occurring on the thermosensitive body 13A. Amorphous glass and crystalline glass are both usable as the sealing glass 13B, or the amorphous glass and the crystalline glass are mixed so as to have a desired linear expansion coefficient and the mixture with the desired linear expansion coefficient may be used as the sealing glass 13B.

The ceramic protection pipe 13C is joined with a rear end part of the sealing glass 13B from which the lead wires 15 and 15 are drawn, thereby mechanically reinforcing the sealing glass 13B and improving electric insulation property and mechanical strength of the sealing glass 13B.

The ceramic protection pipe 13C includes a sintered body that has mechanical strength higher than that of the sealing glass 13B, for example, alumina ($Al_2O_3$) or silicon nitride ($Si_3N_4$). The ceramic protection pipe 13C includes unillustrated through holes into which the two lead wires 15 and 15 are respectively inserted, along a center axis direction L.

The lead wires 15 and 15 drawn from the main body 13 are respectively connected to the paired terminals 17 and 17 that are held by the first housing 19. The lead wires 15 and 15 each include, for example, Dumet wire, and the terminals 17 and 17 each include a metal material having high electric conductivity, such as copper. The Dumet wire is a composite wire in which an iron-nickel alloy having thermal expansion coefficient close to that of glass is used as a center core, and the center core is cladded with copper or a copper alloy as an outer layer.

The first housing 19 covers from the middle of the ceramic protection pipe 13C of the main body 13 up to the middle of each of the terminals 17 and 17. As described above, in the primary molded body 10, the whole of the sealing glass 13B and a part of the ceramic protection pipe 13C are exposed from the first housing 19.

The first housing 19 includes a resin mold layer that is formed by disposing the sensor element 11 in a cavity of a mold for injection molding and discharging a molten resin into the cavity. The first housing 19 includes an appropriate resin material such as polyphenylene sulfide (PPS) and nylon. A second housing 21 of the secondary molded body 20 described later is similarly formed.

The first housing 19 includes a sensor element supporting column 19A (supporting column 19A) and a base body 19B that supports the sensor element supporting column 19A.

The sensor element supporting column 19A extends from side communicating with the base body 19B, toward a front end in the center axis direction L, and surrounds, at the front end, an outer periphery of the ceramic protection pipe 13C of the main body 13 to support the ceramic protection pipe 13C. The supporting column 19A internally supports the lead wires 15 and 15 from the front end supporting the main body 13 to the rear end communicating with the base body 19B.

The base body 19B internally supports the lead wires 15 and 15 continuously from the supporting column 19A, and supports the terminals 17 and 17 that respectively communicate with the lead wires 15 and 15. A part of each of the terminals 17 and 17 is exposed from the rear end of the base body 19B, and the exposed part is connected to an unillustrated terminal of an apparatus for temperature detection, inside a fitting recessed portion 21C of the second housing 21 described later.

[Secondary Molded Body 20]

Next, the secondary molded body 20 is described with reference to FIG. 2.

The secondary molded body 20 includes the second housing 21 that covers surroundings of the primary molded body 10. A rear end surface of the first housing 19, however, is not covered with the second housing 21 and is exposed.

In the secondary molded body 20, the main body 13 is firmly supported by the first housing 19. Therefore, positional displacement of the main body 13 does not occur or is suppressed to very small even if displacement occurs, in secondary molding. Accordingly, the main body 13 is disposed at a desired position of the secondary molded body 20 in a radial direction R and in the center axis direction L.

The second housing 21 includes a sensor element accommodating column 21A, a base body 21B, and the fitting recessed portion 21C. The sensor element accommodating column 21A accommodates the sensor element supporting column 19A of the first housing 19. The base body 21B accommodates the base body 19B of the first housing 19. The mating recessed portion 21C receives counterpart equipment.

The main body 13 of the primary molded body 10 is disposed at a center part of the sensor element accommodating column 21A in the radial direction R, and a thickness of the second housing 21 that covers the surroundings of the main body 13 in the radial direction is made uniform in a circumferential direction.

[Procedure of Fabricating Temperature Sensor 1]

The temperature sensor 1 having the above-described configuration is generally fabricated in the following manner.

First, the primary molded body 10 is fabricated through injection molding. At this time, the sensor element 11 is disposed at the predetermined position in the cavity of the mold for primary molding through the injection molding, and the sensor element 11 is insert-molded. As a result, the primary molded body 10 in which the sensor element 11 and the first housing 19 are integrally molded is obtained.

Next, the primary molded body 10 is disposed in a cavity of a mold for secondary molding, and a molten resin is injected into the cavity to form the secondary molded body 20. The molten resin injected into the cavity spreads to the surroundings of the primary molded body 10 and covers the primary molded body 10.

After predetermined time elapses from injection of the molten resin, the mold is opened and the secondary molded body 20 is taken out to obtain the temperature sensor 1.

[Procedure of Primary Molding]

Now, the procedure of the primary molding is described with reference to FIG. 3.

Figure 3A:
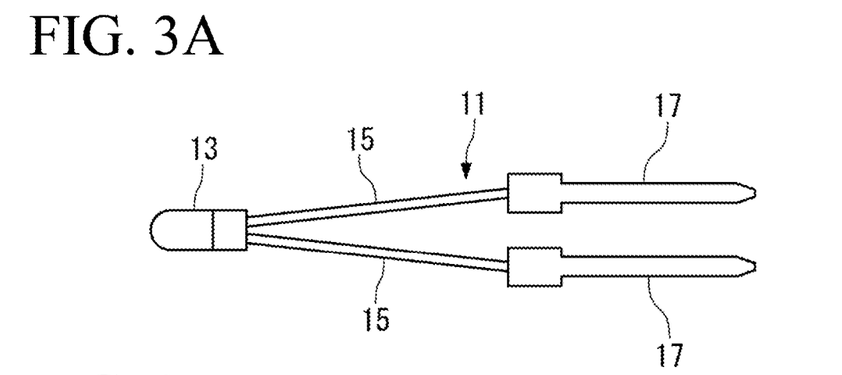
FIGS. 3A to 3C are diagrams illustrating a procedure of primary molding of the temperature sensor according to the first embodiment, FIG. 3A illustrating a sensor element only, FIG. 3B being a schematic cross-sectional view when a sensor element is disposed in a mold for injection molding, and FIG. 3C being a partial enlarged view of FIG. 3B.
Figure 3B:
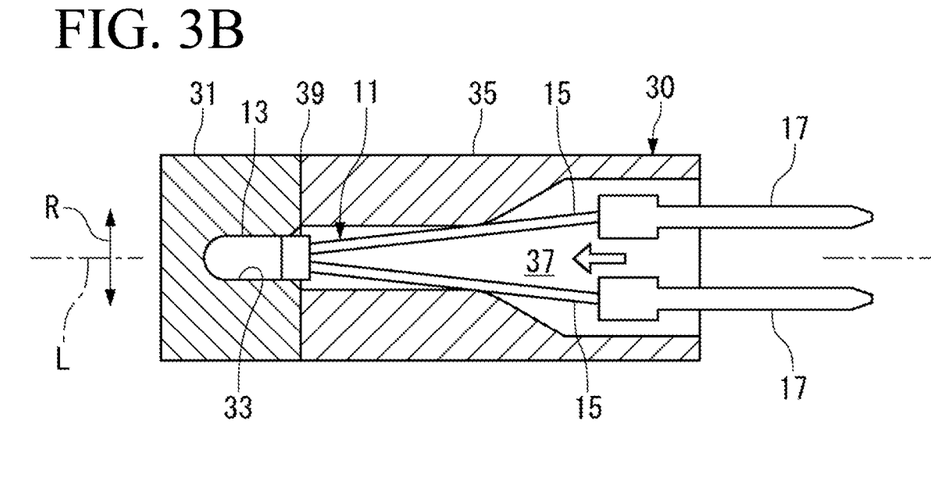
Figure 3C:
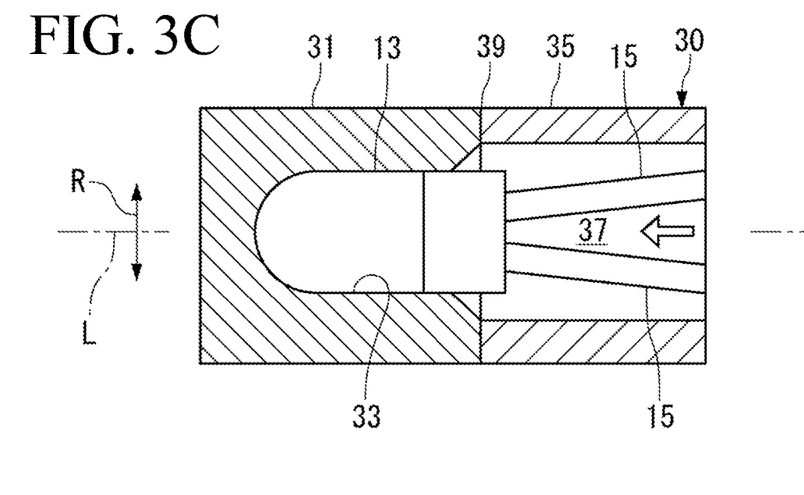

To perform the primary molding, the sensor element 11 illustrated in FIG. 3A is disposed in cavities 33 and 37 of a mold 30 as illustrated in FIGS. 3B and 3C.

The mold 30 includes two elements of a first mold 31 and a second mold 35. The first mold 31 and the second mold 35 include a mold parting surface 39 in a direction orthogonal to the center axis direction L of the primary molded body 10. The mold parting surface 39 functions as air vent (air bleeder) of the mold 30.

As illustrated in FIG. 3C, the first mold 31 mainly corresponds to the main body 13.

In the first cavity 33 of the first mold 31, a gap with the main body 13, mainly, with the sealing glass 13B is set to a minute amount, which prevents the injected molten resin from entering surroundings of the sealing glass 13B. In addition, the gap with the sealing glass 13B is set to the minute amount, which allows the first mold 31 to prevent displacement of the main body 13 during the primary molding.

As illustrated in FIG. 3C, the second mold 35 is provided mainly corresponding to the lead wires 15 and 15 and the terminals 17 and 17. The second mold 35, however, corresponds to the rear end side of the ceramic protection pipe 13C.

The second cavity 37 of the second mold 35 is a part for molding of the first housing 19, and includes a clearance that has the substantially same shape and dimension as those of the first housing 19.

When the injection molding is performed while the sensor element 11 is disposed in the mold 30, the molten resin is injected in a direction of a void arrow. The molten resin spreads in the second cavity 37 of the mold 30 toward the ceramic protection pipe 13C up to the mold parting surface 39.

In the first mold 31 forward of the mold parting surface 39, however, adjusting viscosity of the resin makes it possible to inhibit the molten resin from flowing into between the first mold 31 and the sealing glass 13B when the gap between the first mold 31 and the sealing glass 13B is narrow inside the first cavity 33. As a result, the main body 13, specifically, the sealing glass 13B and the front end side of the ceramic protection pipe 13C are kept exposed without being provided with the first housing 19.

Accordingly, a region of the sealing glass 13B (main body 13) supported by the first mold 31 is exposed, continuously in the circumferential direction of the surface, from the first housing 19.

On the other hand, the main body 13 is supported at the fixed position by the first mold 31 such that the gap with the first mold 31 is narrow inside the first cavity 33. In other words, the main body 13 of the sensor element 11 is not displaced or less displaced even if displacement occurs, from the predetermined position even if the molten resin flowing into the first cavity 33 from the second cavity 37 of the second mold 35 because the main body 13 is positioned by the first mold 31. Therefore, the main body 13 is disposed at the desired position of the primary molded body 10 in the radial direction R and the center axis direction L. In addition, since the main body 13 is not displaced, the lead wires 15 and 15 communicating with the sealing glass 13B and the terminals 17 and 17 are hardly displaced.

[Effects of Temperature Sensor 1]

Next, effects achieved by the temperature sensor 1 are described.

In the primary molded body 10 of the temperature sensor 1, a part of the main body 13 is not covered with the first housing 19 and is exposed. Therefore, it is possible to use the mold 30 that has a minute gap with the main body 13 in resin molding. According to the primary molded body 10, it is possible to prevent displacement of the main body 13 in the injection molding. This enables the main body 13 supported by the first housing 19 including the resin mold layer to be disposed at the desired position. Further, according to the primary molded body 10, the short mold itself does not occur originally. This is true of the secondary molded body 20.

As for the temperature sensor 1, even when the secondary molding is performed on the primary molded body 10 to provide the second housing 21, it is possible to dispose the main body 13 at the desired position also in the temperature sensor 1 having the second housing 21 because the main body 13 is disposed at the desired position by the first housing 19. Accordingly, the temperature sensor 1 can contribute to accurate temperature detection by suppressing temperature variation.

Further, in the primary molded body 10, the whole of the sealing glass 13B and the part of the ceramic protection pipe 13C are exposed continuously in the circumferential direction, and appearance of the main body 13 is visually recognizable without exception after the primary molding. This allows for observation of damage of, for example, the thermosensitive body 13A or the sealing glass 13B of the main body 13 after the primary molding through the injection molding, for example. This makes it possible to prevent a defective primary molded body 10 from being provided to the secondary molding. Therefore, the primary molded body 10 according to the present embodiment also generates a profit in quality control.

In contrast, in a case of the molded body in which only a part of the main body 100 is exposed from the resin mold 101 as illustrated in FIG. 6B, it is difficult to visually recognize a part covered with the resin mold 101 from appearance.

Further, in the main body 13 of the primary molded body 10, the part of the ceramic protection pipe 13C that has strength higher than that of the sealing glass 13B is covered with the first housing 19. Accordingly, even if high pressure is applied from the molten resin in the injection molding, the ceramic protection pipe 13C is not damaged.

Second Embodiment

Next, a temperature sensor 2 according to a second embodiment of the present invention is described with reference to FIG. 4 and FIG. 5.

The temperature sensor 1 of the first embodiment is fabricated through the primary molding and the secondary molding by the injection molding; however, the secondary molding by the injection molding in the present invention is optional means in the second embodiment. In other words, in the present invention, the temperature sensor 2 may be fabricated through mating of the primary molded body with a metal member that is separately molded. An example thereof is described as the second embodiment.

Note that components similar to those in the first embodiment are denoted by the same reference numerals as those in the first embodiment in FIG. 4 and FIG. 5, and description of such components is omitted.

Figure 4A:
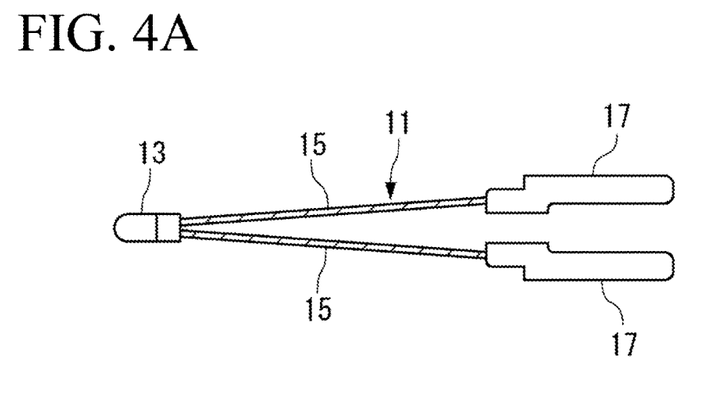
FIGS. 4A and 4B each illustrate a temperature sensor according to a second embodiment of the present invention, FIG. 4A being a plan view of a sensor element, and FIG. 4B being a planar cross-sectional view of a first housing including the sensor element.
Figure 4B:
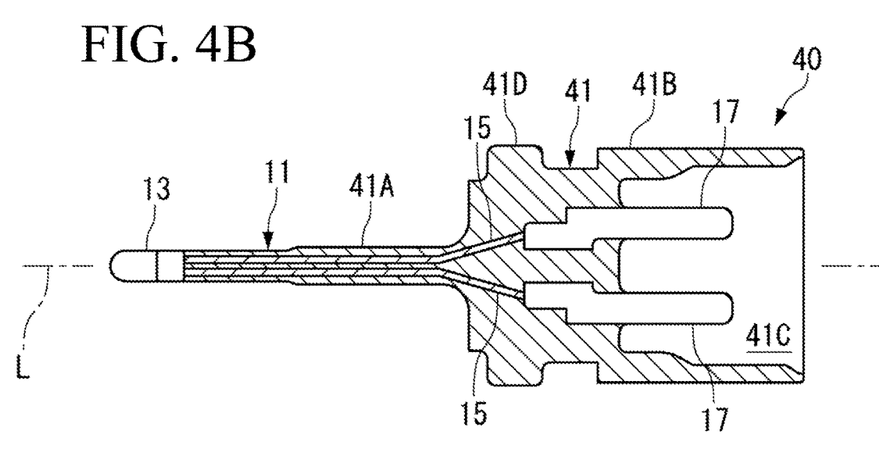
Figure 5A:
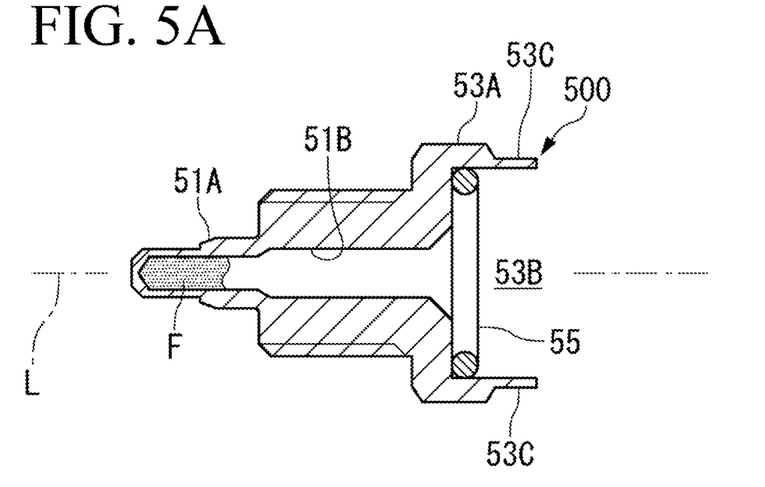
FIGS. 5A to 5C each illustrate the temperature sensor according to the second embodiment, FIG. 5A being a planar cross-sectional view of a second housing, FIG. 5B being a partial planar cross-sectional view of the temperature sensor in which the first housing and the second housing are assembled with each other, and FIG. 5C being a plan view illustrating the temperature sensor in which the first housing and the second housing are assembled with each other.
Figure 5B:
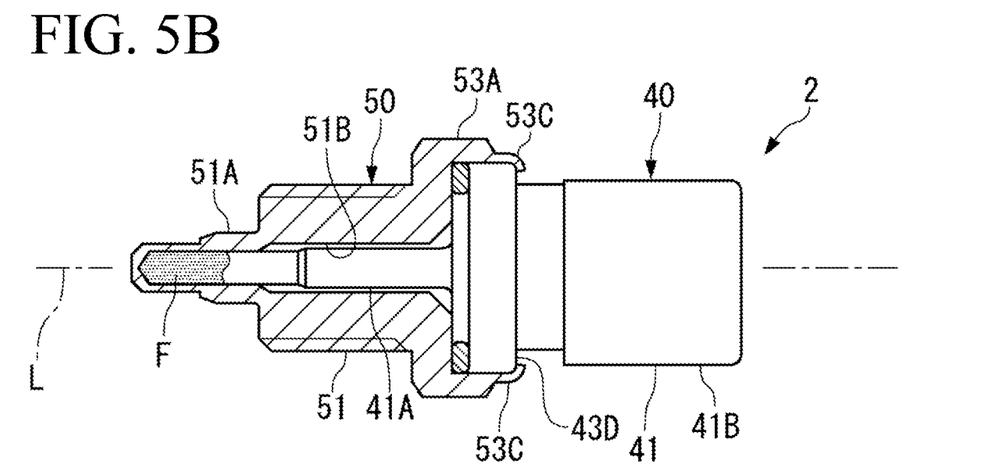
Figure 5C:
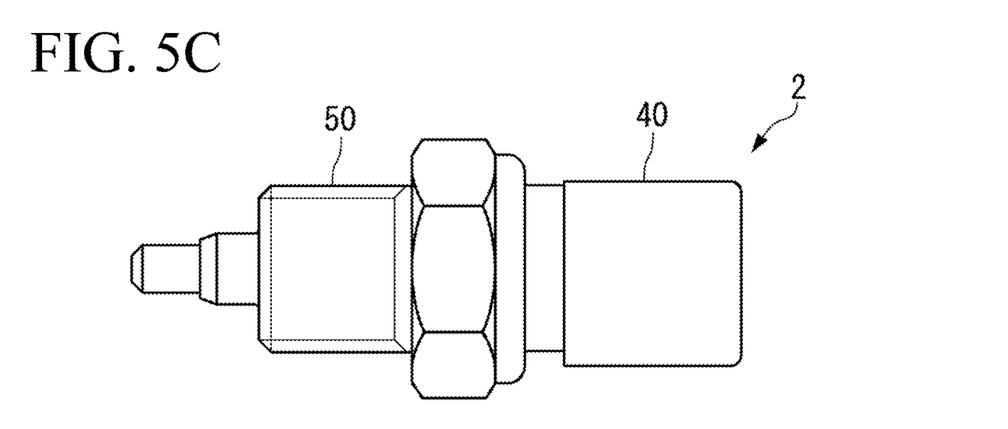

The temperature sensor 2 according to the second embodiment includes a resin molded body 40 including the sensor element 11 illustrated in FIGS. 4A and 4B, and a metal molded body 50 illustrated in FIG. 5A. As illustrated in FIGS. 5B and 5C, the temperature sensor 2 is configured by mating the resin molded body 40 and the metal molded body 50 with each other.

[Resin Molded Body 40]

The sensor element 11 of the resin molded body 40 is covered with a first housing 41 including a resin mold, except for a part of the main body 13.

The first housing 41 includes a sensor element supporting column 41A and a base body 41B that supports the sensor element supporting column 41A, as with the first housing 19 of the first embodiment. The first housing 41 includes, inside the base body 41B, a mating recessed portion 41C that receives counterpart equipment, and the terminals 17 and 17 are exposed inside the mating recessed portion 41C.

The resin molded body 40 is mutually mated with the metal molded body 50 through insertion of the sensor element supporting column 41A of the first housing 41 into a sensor element accommodating chamber 51B of the metal molded body 50 illustrated in FIG. 5A. The first housing 41 includes a caulking ring 41D on front end side of the base body 41B. The caulking ring 41D is used for mating with the second housing 51 of the metal molded body 50.

The resin molded body 40 is fabricated through injection molding with use of the mold corresponding to the main body 13 and the mold corresponding to the lead wires 15 and 15 and the terminals 17 and 17, as with the first embodiment. The first housing 41 supports the main body 13 when a front end thereof is in contact with the rear end of the ceramic protection pipe 13C of the main body 13. Note that the first housing 41 does not surround the ceramic protection pipe 13C; but the first housing 41 covers and holds the lead wires 15 and 15 and the terminal 17 and 17, which allows the resin molded body 40 to support the main body 13.

[Metal Molded Body 50]

Next, the metal molded body 50 is described with reference to FIG. 5A.

The metal molded body 50 includes a metal material, for example, stainless steel. The metal molded body 50 is fabricated through, for example, casting.

The metal molded body 50 includes a second housing 51, a sensor element accommodating column 51A that accommodates the sensor element supporting column 41A of the resin molded body 40 inside, and a base body 53A that supports the sensor element accommodating column 51A.

The sensor element accommodating column 51A includes the sensor element accommodating chamber 51B in which the sensor element supporting column 41A is to be accommodated. The sensor element accommodating chamber 51B extends from a caulking chamber 53B formed inside the base body 53A, to the vicinity of a front end of the sensor element accommodating column 51A.

A front end of the sensor element accommodating chamber 51B is filled with a filler F that has high thermal conductivity and fluidity, and the main body 13 of the sensor element supporting column 41A accommodated in the base body 53A comes into contact with an inner wall of the sensor element accommodating column 51A through the filler F. As the filler F, for example, a filler that is obtained by, with use of silicone oil as base oil, mixing powder that has thermal conductivity higher than that of the base oil, such as alumina, to the base oil.

The base body 53A includes the caulking chamber 53B in which the caulking ring 41D of the resin molded body 40 is to be accommodated. An O-ring 55 that seals the sensor element accommodating chamber 51B from outside, is inserted into the caulking chamber 53B.

The base body 53A is integrally formed with a caulking piece 53C that projects rearward.

[Mated Body of Resin Molded Body 40 and Metal Molded Body 50]

The sensor element supporting column 41A of the resin molded body 40 is inserted up to the front end of the sensor element accommodating chamber 51B of the metal molded body 50. As a result, the base body 41B of the resin molded body 40 is pushed up to a predetermined position of the caulking chamber 53B of the metal molded body 50. The caulking piece 53C is folded inward to caulk the caulking ring 41D against elastic force of the O-ring 55, which results in the temperature sensor 2 including a mated body of the resin molded body 40 and the metal molded body 50, as illustrated in FIGS. 5B and 5C.

The main body 13 of the temperature sensor 2 comes into contact with the second housing 51 of the metal molded body 50 without the first housing 41 of the resin molded body 40. In the present embodiment, the main body 13 and the second housing 51 indirectly come into contact with each other because of the filler F; however, the main body 13 and the second housing 51 may directly come into contact with each other.

The resin molded body 40 and the metal molded body 50 each include a cross-section with a circular outer shape, and each of the sensor element accommodating chamber 51B and the caulking chamber 53B of the metal molded body 50 is also a circular clearance.

[Effects of Temperature Sensor 2]

As for the temperature sensor 2, the whole of the main body 13 of the resin molded body 40 is not covered with the first housing 41 and is exposed. This makes it possible to prevent displacement of the main body 13 during the injection molding, and to accordingly dispose the main body 13 supported by the first housing 41 at the desired position, as with the temperature sensor 1 of the first embodiment.

Further, even when the resin molded body 40 and the metal molded body 50 are mated with each other, it is possible to dispose the main body 13 at the desired position also in the temperature sensor 2 including the metal molded body 50 because the main body 13 is disposed at the desired position by the first housing 41. Accordingly, the temperature sensor 2 can contribute to accurate temperature detection by suppressing temperature variation.

Moreover, in the resin molded body 40, the whole of the main body 13 is exposed. This allows for observation of damage of the main body 13, for example, the thermosensitive body 13A after molding of the resin molded body 40. This makes it possible to prevent a defective resin molded body 40 from being mated with the metal molded body 50 to configure the temperature sensor 2.

Furthermore, the main body 13 of the resin molded body 40 is not surrounded by the first housing 41 as the resin mold layer. Therefore, even if high pressure is applied from the molten resin in the injection molding, the main body 13 is not damaged.

Although the first embodiment and the second embodiment have been described hereinbefore as the preferred embodiments of the present invention, the configurations described in the above-described embodiments may be selected or appropriately modified without departing from the scope of the present invention.

The example in which the entire surface of the sealing glass 13B is exposed has been described in the first embodiment, and the example in which the entire surface of the main body 13 is exposed has been described in the second embodiment. The present invention, however, is not limited to the configurations.

In other words, it is possible to prevent displacement of the main body 13 in the primary molding when only a part of the main body 13 in the center axis direction L is supported by a mold. Accordingly, in the present invention, it is possible to use the first mold 31 that has a gap small by about one-third of the length of the main body 13 in the center axis direction L, for example. In any cases, the region of the sealing glass 13B (main body 13) supported by the first mold 31 is exposed, continuously in the circumferential direction of the surface, from the first housing 19.

To confirm presence or absence of damage of, for example, the thermosensitive body 13A of the main body 13 after the primary molding, however, it is necessary to expose the part corresponding to the thermosensitive body 13A from the first housing 19. In addition, to confirm presence or absence of damage of the sealing glass 13B, it is necessary to expose the part corresponding to the whole of the sealing glass 13B from the first housing 19. Accordingly, in the present invention, the main body 13 is preferably exposed from the first housing 19 except that the supported part of the main body 13.

In the first embodiment and the second embodiment described above, the example in which the main body 13 includes the ceramic protection pipe 13C on the rear end side of the sealing glass 13B has been described. The present invention, however, may use a main body that protects the thermosensitive body 13A with only the sealing glass 13B without including the ceramic protection pipe 13C.

Further, the described materials of the main body 13, the lead wires 15 and 15, the terminals 17 and 17, and the resin mold layer are merely examples, and other respective materials may be used in the present invention. The configuration of each of the temperature sensors 1 and 2 described in the embodiments is merely illustrative, and other configuration may be adopted in the present invention.

Further, in the present embodiments, the primary molded body 10 is assembled with the secondary molded body 20 to configure the temperature sensor 1, and the resin molded body 40 is assembled with the metal molded body 50 to configure the temperature sensor 2. The present invention, however, allows single use of the primary molded body 10 or the resin molded body 40 as the temperature sensor.

REFERENCE SIGNS LIST

1, 2 Temperature sensor
10 Primary molded body
11 Sensor element
13 Main body
13A Thermosensitive body
13B Sealing glass
13C Ceramic protection pipe
15 Lead wire
17 Terminal
19 First housing
19A Sensor element supporting column
19B Base body
20 Secondary molded body
21 Second housing
21A Sensor element accommodating column
21C Mating recessed portion
30 Mold
31 First mold
33 First cavity
35 Second mold
37 Second cavity
39 Mold parting surface 40 Resin molded body
41 First housing
41A Sensor element supporting column
41B Base body
41C Mating recessed portion
41D Caulking ring
50 Metal molded body
51 Second housing
51A Sensor element accommodating column
51B Sensor element accommodating chamber
53A Base body
53B Caulking chamber
53C Caulking piece
55 O-ring
100 Main body
101 Resin mold
F Filler

The invention claimed is:

1. A temperature sensor, comprising:
a sensor element that includes a main body and paired lead wires that extend-from the main body, the main body including a thermosensitive body, a sealing glass covering the thermosensitive body and a protection pipe which reinforces the sealing glass;
a first housing that includes a resin mold layer and holds the sensor element, wherein
the sensor element is held and supported by the first housing such that at least a portion of an outer periphery of the protection pipe of the main body is surrounded by the first housing continuously in a circumferential direction, while at least a part of the surface of the sealing glass of the main body is exposed from the first housing; and
a second housing that surrounds the sensor element and the first housing, wherein the second housing covers the at least part of the surface of the sealing glass that is exposed from the first housing and at least a portion of an outer periphery of the protection pipe that is not surrounded by the first housing.

2. The temperature sensor according to claim 1, wherein the second housing around the main body has a uniform thickness in the circumferential direction.

3. The temperature sensor according to claim 1, wherein the protection pipe of the main body of the sensor is made of a ceramic.

4. A temperature sensor, comprising:
a sensor element that includes a main body and paired lead wires that extend from the main body, the main body including a thermosensitive body, a sealing glass covering the thermosensitive body and a protection pipe which reinforces the sealing glass; and
a first housing that includes a resin mold and holds the sensor element, wherein
the sensor element and the first housing are integrally molded through insert molding, and
at least a portion of an outer periphery of the protection pipe is surrounded by the first housing continuously in a circumferential direction, and a remaining portion of the protection pipe and at least a part of the surface of the sealing glass are uncovered by the first housing.

5. A method of making a temperature sensor, comprising:
positioning a sensor element that includes a main body and paired lead wires that extend from the main body, the main boding including a thermosensitive body, a sealing glass covering the thermosensitive body and a protection pipe which reinforces the sealing glass into a mold, wherein the mold engages at least a portion of an outer periphery of the protection pipe of the main body continuously about a first circumferential surface of the main body and the paired lead wires extend into a cavity of the mold;
injecting a resin into the cavity of the mold;
curing the resin to form a first housing wherein the first housing engages a remaining second circumferential surface of the protection pipe of the main body such that the first circumferential surface of the main body protrudes from the distal end of the first housing;
positioning the first housing in a cavity of a second mold;
injecting a resin into the cavity of the second mold; and
curing the resin to form a second housing in contact with the first circumferential surface of the main body of the sensor element and the first housing.

6. The method of claim 5, wherein at least a part of a surface of the sealing glass of the main body is exposed from the first housing.

* * * * *